US005775758A

United States Patent [19]
Eberspacher

[11] Patent Number: 5,775,758
[45] Date of Patent: Jul. 7, 1998

[54] PORTABLE EMERGENCY CARE FACILITY

[76] Inventor: Charles H. Eberspacher, 2 NW. 61st Ter., Gladstone, Mo. 64118

[21] Appl. No.: 650,467

[22] Filed: May 20, 1996

[51] Int. Cl.$^6$ .................. B60P 3/14; A61G 3/00
[52] U.S. Cl. ....................... 296/24.1; 296/19
[58] Field of Search .................. 296/19, 24.1, 1.1

[56] References Cited

U.S. PATENT DOCUMENTS

| | | | |
|---|---|---|---|
| 3,118,187 | 1/1964 | Alimanestiano | 20/2 |
| 3,694,023 | 9/1972 | Burgess | 296/24.1 |
| 4,181,347 | 1/1980 | Clark | 296/19 |
| 4,210,355 | 7/1980 | Legeau | 296/19 |
| 4,339,146 | 7/1982 | Lehmann | 296/19 |
| 4,425,978 | 1/1984 | Star | 296/19 X |
| 4,449,746 | 5/1984 | Clark | 296/24.1 |
| 4,712,822 | 12/1987 | Janos et al. | 296/24.1 |
| 4,915,435 | 4/1990 | Levine | 296/24.1 |
| 5,236,390 | 8/1993 | Young | 296/24.1 |
| 5,398,986 | 3/1995 | Koob | 296/24.1 |

FOREIGN PATENT DOCUMENTS 656253  5/1929  France ................. 296/19

OTHER PUBLICATIONS

"Medical care modules aid in Alaska patient airlifts," *Sohio Magazine*, Winter 1983-84.

*Primary Examiner*—Joseph D. Pape
*Attorney, Agent, or Firm*—Armstrong, Teasdale, Schlafly & Davis

[57] ABSTRACT

A portable emergency care facility having an elongate enclosure having first and second ends and two opposing long walls extending between the first and second ends. There are a plurality of wheels on the enclosure to facilitate transporting the facility. Inside the enclosure are a plurality of treatment tables extending from one of the long walls toward the center of the enclosure, each of the treatment tables being sufficiently spaced from the others to allow patient access on both sides of the treatment tables, and being separated by a by a movable privacy curtain. There is an access opening in each end of the enclosure, and an air curtain at each access opening. An oxygen source, and a manifold and piping system extending through the wall adjacent the treatment tables, with an outlet adjacent each treatment table. A compressor for generating pressurized air, and a manifold and piping system extending through the wall adjacent the treatment tables, with an outlet adjacent each treatment table. A vacuum pump for generating suction, and a manifold and piping system extending through the wall adjacent the treatment tables, with an outlet adjacent each treatment table.

20 Claims, 5 Drawing Sheets

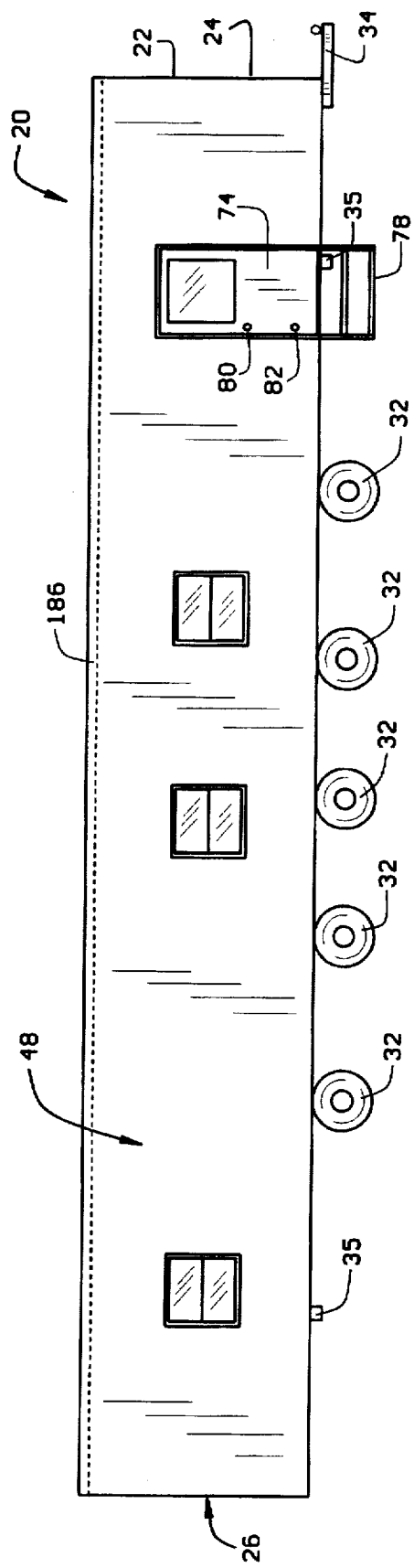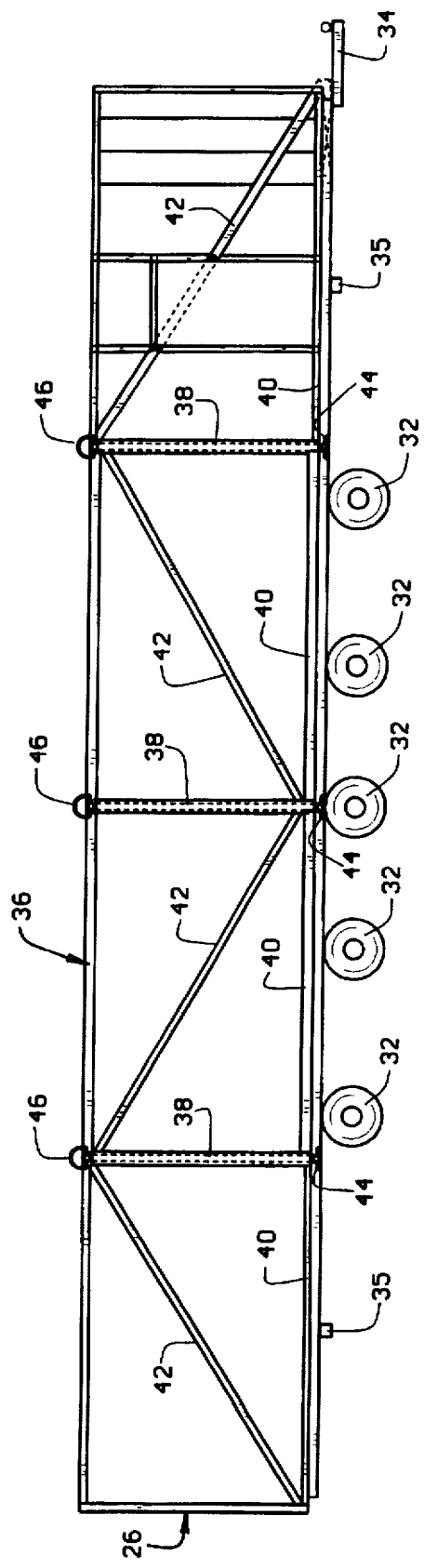

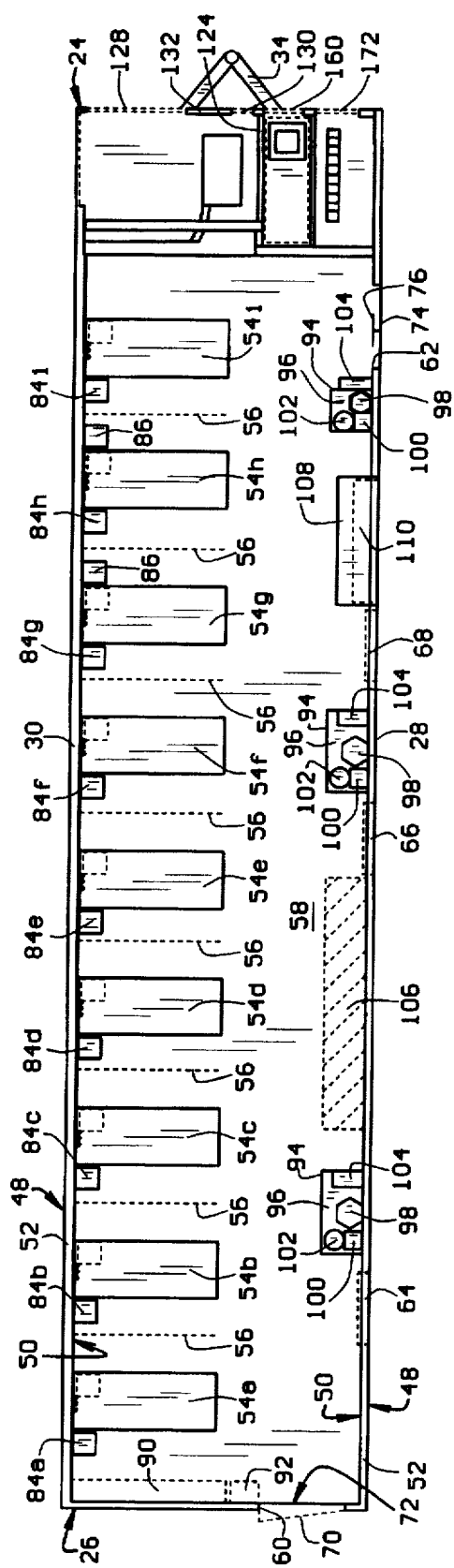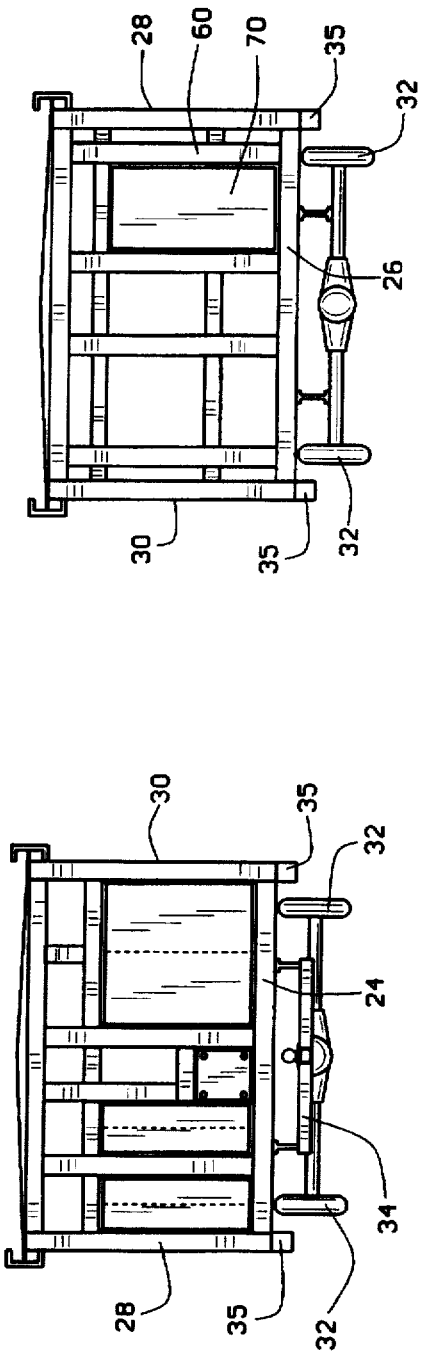

PORTABLE EMERGENCY CARE FACILITY

FIELD OF THE INVENTION

This invention relates to a portable emergency care facility.

BACKGROUND AND SUMMARY OF THE INVENTION

This invention relates to a portable emergency care facility.

There are many situations where it is desirable to temporarily set up an emergency-room type health care facility, for example in the aftermath of a natural disaster where the number of sick and injured exceeds the capacity of existing local emergency room facilities. While ambulances are available that provide elaborate facilities for health care, these ambulances are usually intended for transporting, rather than treating, patients, and usually can only accommodate one or two patients. Moreover these ambulances typically do not provide sufficient room or access to the patient for the delivery of extended emergency care.

The portable emergency care facility of the present invention is readily transportable on the ground or by air, and thus can be brought to the patients, rather than requiring the patients to be transported to a distant facility. It provides self-contained, self-sufficient facility for the delivery of emergency care for a plurality of patients. The portable emergency care facility of the present invention comprises an elongate wheeled enclosure with first and second ends and two opposing long walls therebetween. There are plurality of patient treatment tables extending generally perpendicularly from one of the elongate walls, spaced from each other to provide access to the patient on both sides. The treatment tables are separated by privacy curtains extending in the spaces between the treatment tables. The ends of the treatment tables are spaced from the opposite long wall to provide an access passage extending substantially the length of the enclosure. There is a doorway adjacent each end of the access passage. The doorways have doors, and preferably also have air curtains to protect the interior of the enclosure when the doors are open.

The portable emergency care facility preferably also includes a diesel-powered electric generator for providing electric power inside the enclosure for operating medical equipment, and operating an air compressor to provide compressed air, and a vacuum pump to provide suction. Electrical power, oxygen, compressed air, and suction are preferably available adjacent each table.

The enclosure is provided with water tanks mounted sufficiently high to provide a gravity-fed water supply inside the enclosure. A removable collection tank is associated with each water supply for collecting waste water for disposal.

Thus the present invention provides a portable emergency care facility that can be towed or air-lifted to the site where it is needed, set up with a minimum of preparation, and used for the delivery of emergency care. The portable emergency care facility is completely self-sufficient providing its own electrical power, climate control, and water. In contrast to available ambulances, the portable emergency care facility can be used to simultaneously treat a number of patients. When the emergency is over, the portable emergency care facility can be removed from the site and stored until needed again.

These and other features and advantages will be in part apparent, and in part pointed out hereinafter.

BRIEF DESCRIPTION OF THE DRAWINGS

FIG. 2 is a left side elevation view of the portable emergency care facility;

FIG. 3 is a left side elevation view of the emergency are facility with the external skin removed to show the details of construction;

FIG. 4 is a top plan view of the interior of the portable emergency care facility;

FIG. 5 is a rear end elevation view of the portable emergency care facility with the external skin removed to reveal details of construction; and FIG. 6 is a front end elevation view of the portable emergency care facility with the external skin removed to reveal details of construction.

Corresponding reference numerals indicate corresponding parts throughout the several views of the drawings.

DETAILED DESCRIPTION OF THE PREFERRED EMBODIMENT

Figure 1:
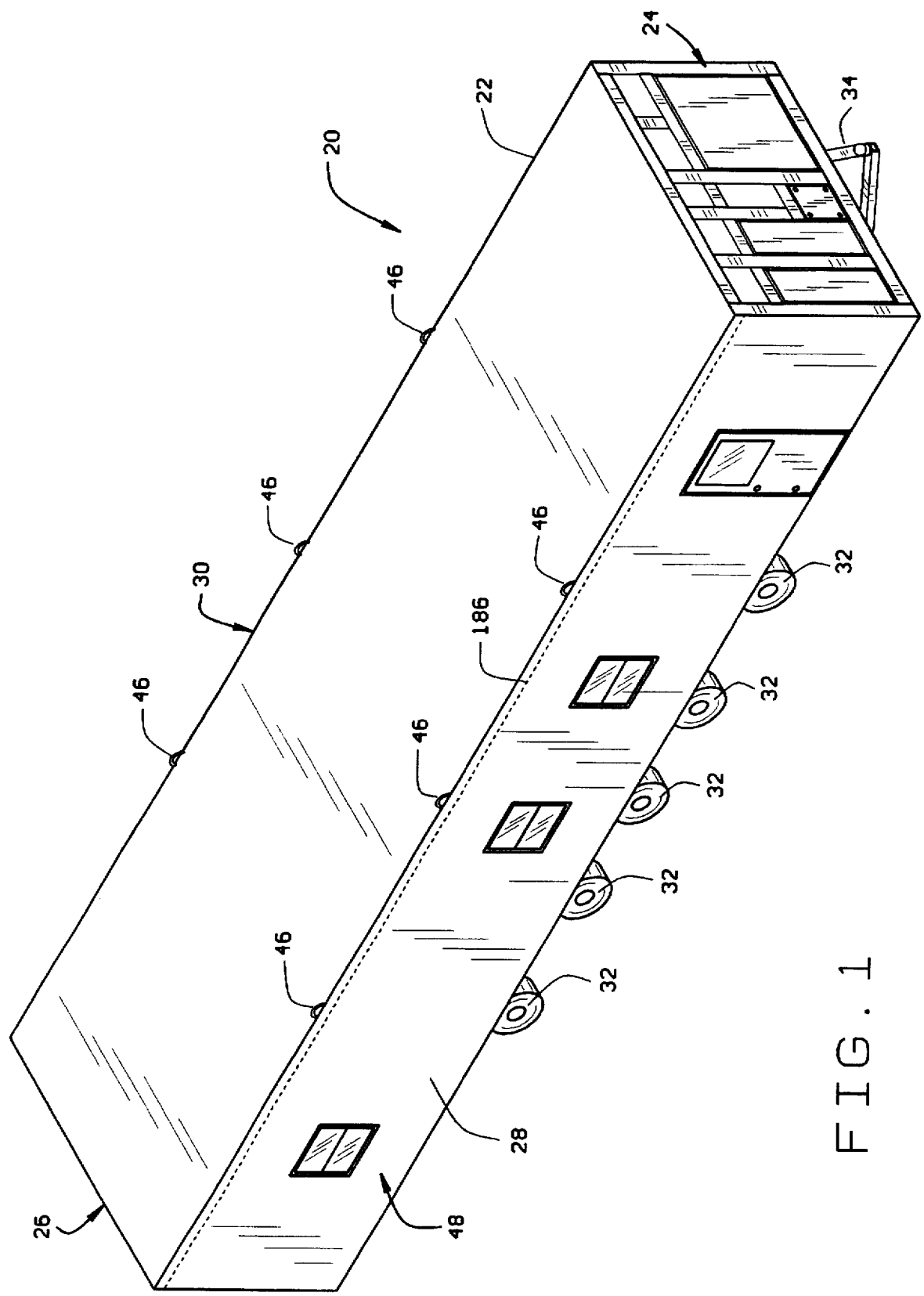
FIG. 1 is a perspective view of a portable emergency care facility constructed according to the principles of this invention.

An embodiment of the portable emergency care facility constructed according to the principles of this invention is indicated generally as 20 in the Figures. The portable emergency care facility 20 comprises an elongate wheeled enclosure 22. The elongate enclosure 22 has a first end 24 and a second end 26, forming the front and back of the enclosure, respectively. Two opposing long walls 28 and 30 extend between the first and second ends 24 and 26, forming the left and right sides of the enclosure, respectively. A plurality of wheels 32 are mounted on the underside of the enclosure 22 to facilitate transporting the emergency care facility 20. There is a hitch 34 at the first end of the enclosure 22 which extends generally forwardly so that the emergency care facility 20 can be towed. "Landing gear" 35 are provided on the facility to extend down to engage the ground and stabilize and level the facility at the site where the facility will be used. The landing gear 35 is preferably of the type that swings down from the underside of the enclosure to an extended position, and when locked in the extended position, telescope to adjust the height and level of the enclosure.

The portable health care facility 20 has a rigid frame 36 comprising a plurality of vertical posts 38, longitudinal beams 40, diagonal cross members 42, and transverse horizontal beams 44 so that the portable health care facility is sufficiently strong to be transported by air. There are preferably rigid eyelets 46 secured to the frame at the top of some of the vertical posts 38 for attaching lines to airlift the enclosure. The exterior of the frame 36 is preferably covered with a skin 48, preferably of thin metal sheets, such as aluminum sheets. The interior of the frame may be also be lined with a skin 50, preferably of thin aluminum sheet or some other suitable material, for example a polymer sheet material such as Formica®. The space between the exterior and interior sheeting is preferably filled with insulation 52, such as fiberglass batting or styrofoam sheets.

Figure 4A:
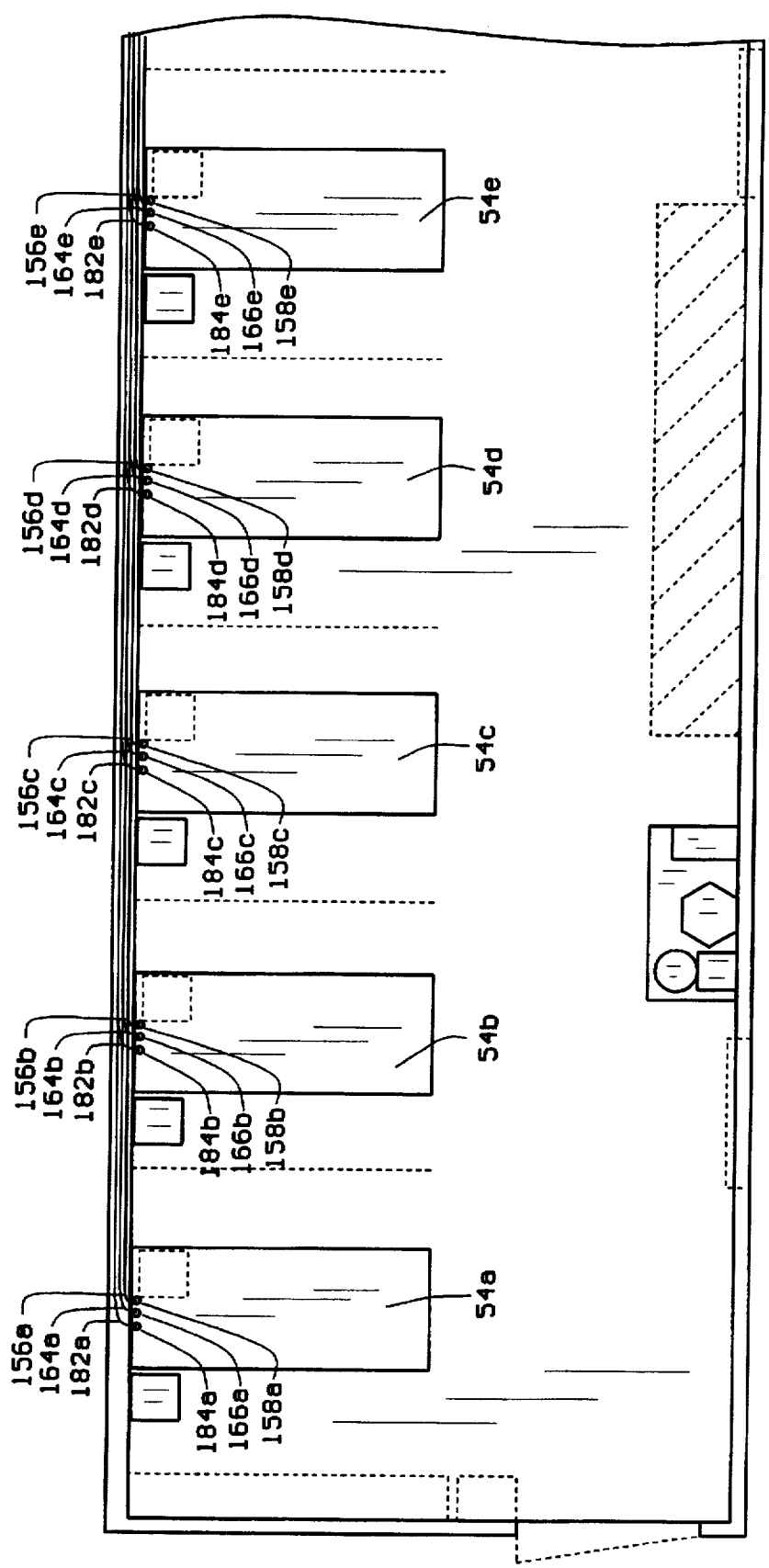
FIG. 4A is a top plan view in part of the rear portion of the portable emergency care facility.
Figure 4B:
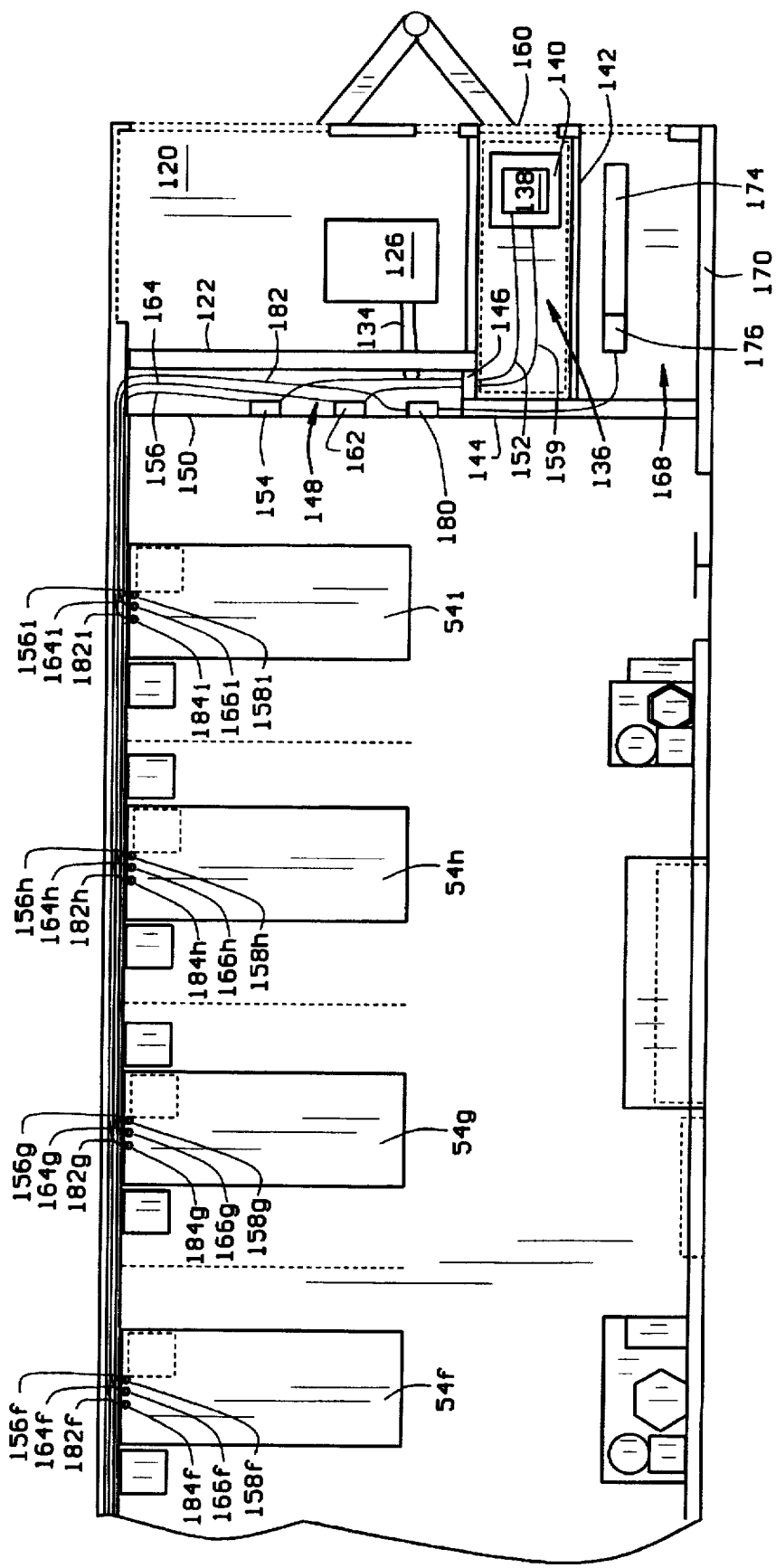
FIG. 4B is a top plan view in part of the front portion of the portable emergency care facility.

One of the more important aspects of the emergency health care facility is the unique layout of the interior, shown best in FIG. 4. A plurality of treatment tables 54a–54i extend from one of the long walls, preferably the right wall 30, toward the center of the enclosure 22. Each of the treatment tables 54 is sufficiently spaced from the others to allow patient access on both sides of the treatment table. The treatment tables 54 are preferably separated by privacy curtains 56 slidably mounted from tracks in the ceiling.

The ends of the treatment tables 54 are spaced sufficiently from the opposite wall 28 to form a passageway 58 extending substantially the length of the enclosure 22, providing ready access to the treatment tables. There is a doorway 60 in the second end 26 at one end of the passageway 58, and a doorway 62 in the side wall 28, adjacent the other end of the passageway 58. This arrangement allows patients to be brought into the facility through one door and assigned a treatment table, and to be removed from the facility to the other door in a continuous manner. There are preferably three windows 64, 66, and 68 on the left side 28, to provide light to the interior of the enclosure, and to provide emergency exits. The doorway 60 has a door 70 hinged thereon, and an air curtain 72 that protects the interior of the enclosure when the door 70 is opened. Similarly, the doorway 62 has a door 74 hinged thereon, and an air curtain 76 that protects the interior of the enclosure when the door 74 is opened. There is a ladder 78 hingedly mounted below each doorway, to facilitate ingress and egress. The ladder 78 can be pivoted underneath the enclosure 20, and latched, during transportation and storage of the emergency care facility. Each of the doors 70 and 74 preferably has two knobs, an upper knob 80 in a vertical position on the door convenient from someone standing on the level of the floor of the enclosure 22, and a lower knob 82 in a vertical position on the door convenient for someone standing on the ground to operate.

There are supply storage cabinets 84a–84i adjacent each treatment table 54, and additional storage can be provided underneath the treatment tables. The cabinets 84 can be used for pillows, blankets, linens, disposable gloves, bandages, cold packs, etc. Some of the treatment tables 54 can be provided with an EKG monitor 86. There is a storage cabinet 90 adjacent the second end 26 of the enclosure 22 for storing additional medical supplies and equipment, such as needles, stethoscopes, flashlights, etc. The bottom of the cabinet can hold counterweights for balancing the weight distribution when the emergency care facility is transported by air. A storage bay 92 can also be positioned adjacent the cabinet 90, for storing a machine such as an x-ray machine or a defibrillator.

Three water stations 94 are provided on the wall 28 opposite from the treatment tables 54. Each water station 94 comprises a counter top 96 with a basin 98. A replaceable, refillable water tank 100 is mounted above the basin to provide a gravity-fed water supply. The basin 98 drains to a removable drain container 102 for holding liquid waste. Thus the facility does not have to be connected to water supply or a sewer. Removable solid waste containers 104 are also provided at each station for holding solid waste.

A storage cabinet 106 is provided on the wall 28 for holding medical supplies and equipment, such as a portable x-ray and x-ray processor, portable EKG, portable defibrillator, portable blood analyzer, or other similar equipment. A counter 108 with overhead storage cabinets 110 is also provided on the wall 28.

There are utility closets at the first end 24 of the enclosure 22. There is an electric generator closet 120, separated from the main part of the enclosure 22 by fire walls 122 and 124.

The closet 120 contains a diesel-powered electric generator 126 for generating electric power for the emergency care facility 20, if a local source of power is not available. A switch is provided so that the generator can be taken off line if the electrical system of the emergency care facility is connected to a local power source. The electric generator 126 is accessible through removable doors 128 and 130 and a removable access panel 132, all on the exterior of the enclosure.

The electric generator 126 is used for powering the medical equipment inside the enclosure, and providing lighting, heating, air conditioning and powering the air curtains 72 and 76. Lights are provided inside the enclosure, preferably on the ceiling. Electric air conditioner and heating units (not shown) are provided on the top of the enclosure 22 to maintain the interior of the enclosure at a comfortable temperature for the health care workers and patients. A power cable 134 extends from the electric generator 126 through the fire wall 122. Electric lines extend from the end of the power cable along the inside side of the fire wall, and then through the walls and ceiling of the enclosure to the points where electric power is needed.

There is a utilities closet 136 adjacent the generator closet 120 for containing a compressor 138 and a vacuum pump 140, both powered by the generator 126, to provide compressed air and suction, respectively. The closet 136 is formed by walls 142, 144, and 146, and opens to a space 148 between an interior wall 150 and the fire wall 122. The interior of the utility closet 136 is accessible through a removable access panel 160 on the exterior of the enclosure. The compressor 138 is mounted in the closet 136 above the vacuum pump 140, and each is mounted on a sliding shelf to slide out of the closet for servicing. The compressor and pump can also be slid out of the closet while in use, if desired. A line 152 extends from the outlet of the compressor through the space 148 to a manifold and gauge 154 mounted on the wall 150. Separate lines 156a through 156i extend from the manifold and gauge unit 154 in the space 148 to the wall 30, and horizontally through the wall to outlets 158a through 158i, respectively, which are positioned on the wall 30, adjacent each of the treatment tables 54. Similarly, a line 159 extends from the outlet of the vacuum pump 138 through the space 148 to a manifold and gauge unit 162 mounted in the wall 150. Separate lines 164a through 164i, extend from the manifold 162 in the space 148 to the wall 30, and horizontally through the wall to outlets 166a through 166i, respectively, which are positioned on the wall 30, adjacent each of the treatment tables 54.

An oxygen closet 168 is located next to the utilities closet 136. The oxygen closet 168 is formed by wall 170, and the wall 142 which separates the oxygen closet from the utilities closet. The oxygen closet 168 is accessible through removable door 172, on the exterior of the enclosure. There are a plurality of oxygen tanks 174 inside the oxygen closet 168, each connected to a regulator and control valve 176. An oxygen line 178 extends from the regulator and control valve 176 to a manifold and monitor unit 180 mounted on the wall 150. Separate lines 182a through 182i, extend from the manifold and monitor unit 180 in the space 148 to the wall 30, and horizontally through the wall to outlets 184a through 184i, respectively, which are positioned on the wall 30, adjacent each of the treatment tables 54.

A perimeter lighting system 186 is provided at the roof line to make the emergency care facility 20 easy to locate, and to illuminate the vicinity of the emergency care facility. Thus, the portable emergency care facility provides a complete, self sufficient emergency care facility that can be transported to the site of need. The facility is ready to use with a minimum of preparation and set up. The facility provides for the efficient flow of patients through the facility. In contrast to existing ambulances, the facility can be used to provide critical care to multiple patients, and permits access to both sides of the patient. Privacy curtains can separate the patients on adjacent treatment tables.

What is claimed:

1. A portable emergency care facility comprising:

an elongate enclosure having first and second ends and two opposing long walls extending between the first and second ends;

a plurality of wheels on the enclosure to facilitate transporting the facility; and a plurality of treatment tables extending from at least one of the long walls toward the center of the enclosure, each of the treatment tables being sufficiently spaced from the others to allow patient access on both sides of the treatment tables.

2. The portable emergency care facility according to claim 1 further comprising an oxygen source, and a manifold and piping system with an outlet adjacent each treatment table.

3. The portable emergency care facility according to claim 2 further comprising a compressor for generating pressurized air, and a manifold and piping system with an outlet adjacent each treatment table.

4. The portable emergency care facility according to claim 3 further comprising a vacuum pump for generating suction, and an manifold and piping system with an outlet adjacent each treatment table.

5. The portable emergency care facility according to claim 1 further comprising at least one doorway in the enclosure and an air curtain adjacent each doorway.

6. The portable emergency care facility according to claim 1 further comprising a doorway in at least one of the opposing long walls.

7. The portable emergency care facility according to claim 6 further comprising a ladder having its top position pivotally attached to the base of the doorway.

8. The portable emergency care facility according to claim 1 further comprising an interior frame construction which reinforces the enclosure for lifting.

9. The portable emergency care facility according to claim 1 further comprising landing gear on the enclosure that can be lowered to level the facility.

10. The portable emergency care facility according to claim 1 further comprising an access aisle between the center of the enclosure and the long wall opposite from the long wall having the treatment tables extending therefrom.

11. The portable emergency care facility according to claim 1 wherein the enclosure has inner height dimensions which accommodate movement of individuals without the individuals having to stoop over within the enclosure.

12. The portable emergency care facility according to claim 1 further comprising a self contained generator within the enclosure.

13. The portable emergency care facility according to claim 12 wherein a fire wall separates the self contained generator from the interior of the enclosure.

14. The portable emergency care facility according to claim 1 wherein the first end includes a hitch extending outwardly therefrom which attaches to a receiving hitch on a vehicle so that the portable emergency care facility may be pulled to a desired location.

15. The portable emergency care facility according to claim 1 further comprising a gravity fed water sink and water waste container within the enclosure.

16. The portable emergency care facility according to claim 15 further comprising a cabinet having a strap extending across the cabinet for securing a water reservoir for the gravity fed water sink.

17. The portable emergency care facility according to claim 1 further comprising a perimeter exterior lighting system.

18. A portable emergency care facility comprising:

an elongate enclosure having first and second ends and two opposing long walls extending between the first and second ends;

a plurality of wheels on the enclosure to facilitate transporting the facility; and a plurality of treatment tables extending from one of the long walls toward the center of the enclosure, each of the treatment tables being sufficiently spaced from the others to allow patient access on both sides of the treatment tables; the treatment tables being separated by a movable privacy curtain;

an access opening adjacent each end, and an air curtain at each access opening;

an oxygen source, and a manifold and piping system extending through the wall adjacent the treatment tables, with an outlet adjacent each treatment table;

a compressor for generating pressurized air, and a manifold and piping system extending through the wall adjacent the treatment tables, with an outlet adjacent each treatment table; and a vacuum pump for generating suction, and a manifold and piping system extending through the wall adjacent the treatment tables, with an outlet adjacent each treatment table.

19. A portable emergency care facility comprising an elongate enclosure having first and second ends, a top panel, a bottom panel, and two opposing long walls extending between the first and second ends, wherein the enclosure encloses medical apparatus and a plurality of treatment tables extending from at least one of the long walls toward the center of the enclosure, each of the treatment tables being sufficiently spaced from the others to allow patient access on both sides of the treatment tables, the treatment tables being separated by privacy curtains.

20. The portable emergency care facility according to claim 19 wherein the top panel includes lifter hooks which attach to aircraft so that the portable emergency room may be lifted to a desired location.

* * * * *